United States Patent Office 3,008,565
Patented Nov. 14, 1961

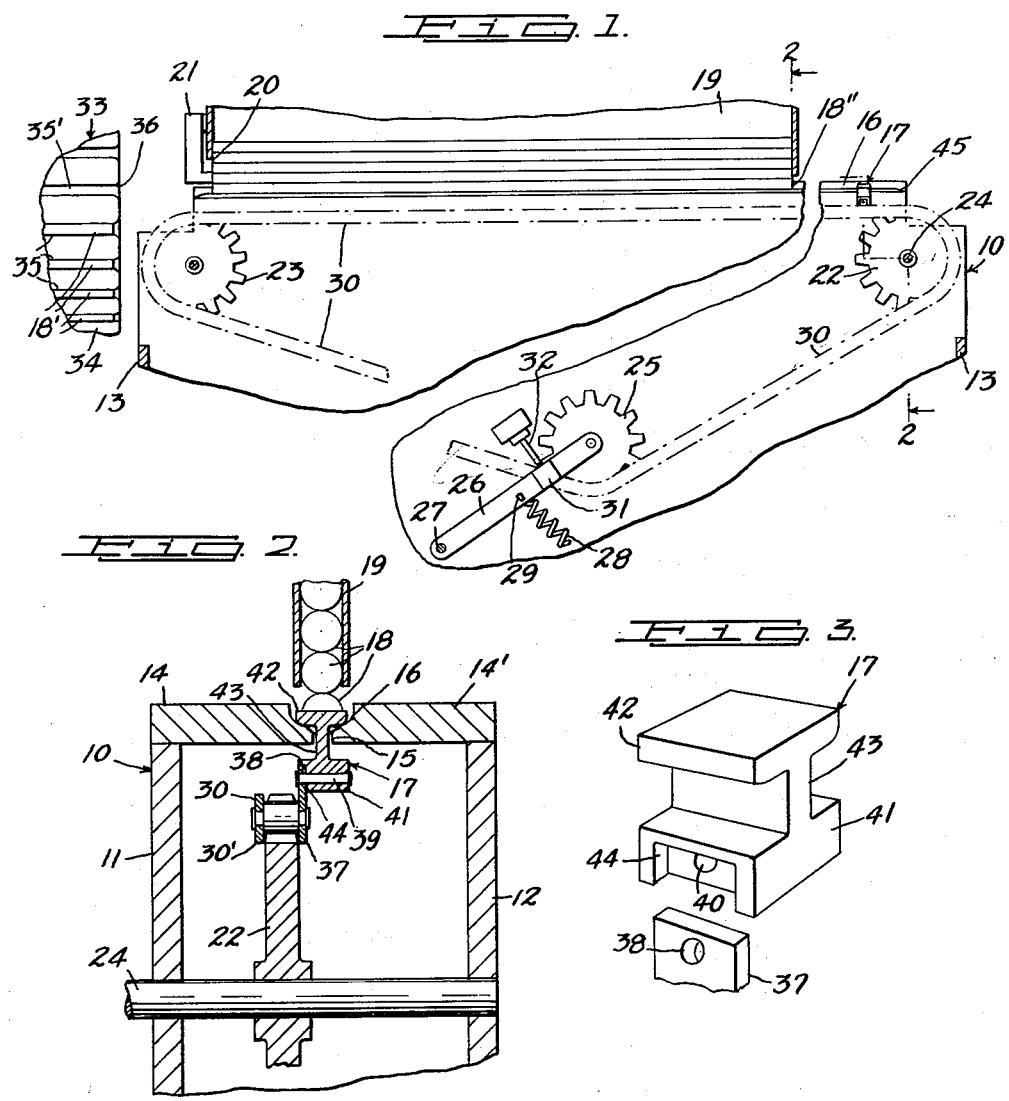

3,008,565
APPARATUS FOR INTERMITTENTLY DELIVERING WORKPIECES TO RECEIVING MEANS
Samuel N. Small, Valley Stream, N.Y., assignor to Julius Duberstein, New York, N.Y.
Filed Feb. 13, 1959, Ser. No. 793,192
2 Claims. (Cl. 198—176)

This invention relates to apparatus for delivering workpieces and similar elongated members to a receiving station employing an intermittently indexing drum or other receiving means. More particularly, the invention deals with an apparatus of the character described, wherein workpieces are hopper fed to a grooved or channelled receiving plate or platform, through which an endless chain is driven at a predetermined speed and, wherein, the chain includes at least one workpiece pusher or feed link operating in the channel of said plate in delivering the workpieces one at a time to grooved portions of an indexing drum synchronized with operation of said chain.

Still more particularly, the invention deals with a structure of the character described, wherein means is employed for automatically stopping the workpiece feed, in the event of failure of any part of the delivery mechanism from functioning properly.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic sectional view of an apparatus made according to my invention, parts of the construction being broken away and parts shown in elevation, with the receiving drum illustrated only in part.

FIG. 2 is an enlarged section on the broken line 2—2 of FIG. 1 and omitting all background showing; and FIG. 3 is a perspective view of the feed or pusher link element which I employ, with the parts in detached position and omitting portions of one of the parts.

In FIGS. 1 and 2 of the drawing, I have illustrated, in part, at 10 diagrammatically the casing of the apparatus which employs opposed side walls 11 and 12, as noted, in part, in FIG. 2 of the drawing, and end walls, indicated, in part, at 13 in FIG. 1 of the drawing and a top plate or supporting table, comprising two substantially similar parts 14, 14'. Note FIG. 2. Adjacent surfaces of the parts 14, 14', at their lower surfaces, are spaced apart to form a narrow groove or passage 15, which is enlarged at upper surfaces of said parts to form a considerably wider groove 16 and the combination of 15 and 16 may be said to define a channel T-shaped in cross-sectional form, through which a feed or pusher element 17 passes in feeding a workpiece, as at 18 arranged in 16, longitudinally of the machine, in the manner later described.

Suitably supported directly above the channel, at one end portion of the casing 10, is a workpiece feeding hopper 19 for supporting the workpieces 18 one above the other in longitudinal alinement with the channel. The discharge end of the hopper 19 is cutaway, as indicated at 20 at the left of FIG. 1, to receive an adjustable gate or control member 21 for support of a next adjacent workpiece from discharge from the hopper as the lowermost workpiece is fed through the apparatus. By adjusting 21 and providing a suitable element 17, two of the workpieces can be simultaneously discharged in operation of the apparatus.

Suitably supported in opposed side walls of the casing 10 is a drive sprocket 22, in horizontal alinement with which is an idler sprocket 23. The shaft 24 of the sprocket 22 extends through one of the sides 11—12, the side 11 as noted in FIG. 2, for actuation through suitable drive means, not shown.

Another tension idler sprocket 25 is also employed, the sprocket being supported on the free end portion of a lever 26, having a pivotal support on at least one end of the side walls of the casing on a pivot axis 27. Suitably fixed to a wall of the casing is a spring 28 which is coupled with the lever 26, as seen at 29, to normally apply the required tension on the drive chain, diagrammatically indicated in FIG. 1 of the drawing at 30 in dot-dash lines and part of one link structure of the chain is illustrated in section in FIG. 2 of the drawing. Lever 26 forms a tensioned support for the sprocket 25.

Adjacent the outer end portion of the lever 26 is a switch actuating block or element 31 for actuating a microswitch, diagrammatically illustrated at 32 in FIG. 1 of the drawing. In other words, when the apparatus is functioning normally with no stress or strain set up or contributed to the chain 30, the microswitch 32 is not operative. However, any strain tending to raise the sprocket 25 will automatically actuate the switch 32 to, in turn, stop the drive of the sprocket 22, thus preventing any jamming of the apparatus, in the event that the same should fail to properly function at any time.

With the present construction, only one of the elements 17 is shown. It will be understood, however, that in different uses of the apparatus, any number of these elements may be spaced along the endless chain to provide the desired timely feed or delivery of the workpieces or products to the receiving station, diagrammatically illustrated in part at 33 in FIG. 1 of the drawing. In the present showing, a small peripheral portion of an indexing drum 34 is shown, the drum having, on its peripheral surface, circumferentially spaced grooves or receiving pockets 35 extending longitudinally thereof and preferably of a length equal to or slightly greater than the length of the workpieces 18.

The drum 34 is actuated in synchronism with the operation of the element 17, so as to position one of the grooves, for example, the groove 35', in horizontal alinement with the channel portion of the plate 14, 14', the admission ends of each of the grooves being slightly flared, as noted at 36, to insure free passage of the workpieces into the grooves 35.

In FIG. 1 of the drawing, part of the workpieces are shown positioned in the grooves at 18', thereby illustrating the direction of feed of the drum 34 in its indexing operation.

Turning now to FIGS. 2 and 3, it will appear that the link 30' of the chain 30, which is shown in section in FIG. 2, includes at one side thereof an extended plate 37 having, at its free end, an aperture 38 for receiving a rivet pin 39, which also passes through an aperture 40 in the enlarged base 41 of the element 17. The element 17 may be said to be of I-beam cross-sectional form, in other words, includes an outer thin crosshead 42 joining the base 41 in a central web portion 43. One side of the base 41 is recessed, as seen at 44, note FIG. 3, to snugly receive the upper end of 37. This construction positively keys the element 17 on 37 to maintain its perpendicular position with respect to the chain. The crosshead 42 of the element 17 may be said to comprise the pusher part of the element; whereas, the base 41 may be said to comprise the mounting part of said element.

Considering FIG. 2 of the drawing, it will appear that the upper horizontal portion of the chain passes through the upper part of the casing 10 beneath 14, 14'; whereas, the web 43 passes through 15 and part of 16 with the crosshead or pusher part 42 operating centrally within the portions 16 of the channel so as to engage the workpiece or product substantially centrally thereof in providing a free feed or delivery of the workpiece longitudinally of 16 and into the alined groove or pocket, as at 35' in FIG. 1 of the drawing.

In FIG. 1, the structure is broken away to clearly indicate that the sprocket 22 is widely spaced with respect to the adjacent end of the hopper 19. The element 17, in other words, passes freely through the channel, preparatory to engaging the exposed end of the workpiece, as at 18" at the right of FIG. 1 of the drawing. It will appear that the walls defining the channel and particularly, the portions 16 of the channel are bevelled, as diagrammatically seen at 45 at the right of FIG. 1 for clear and free entry of the element 17 into the channel, it being noted that the admission end of the channel is substantially in perpendicular alinement with the axis 24 of the sprocket 22.

It will be understood that, after the element 17 passes around the sprocket 23, the drum 34 will be indexed to bring the next successive groove or pocket 35 into position for reception of the next successive workpiece 18. In the feed of the workpiece longitudinally beneath the hopper 19, it will be apparent that, as the lowermost workpiece is being fed through the channel, the righthand end portion of the next adjacent workpiece will automatically drop down in position in the channel and, as the end 18" of the fed workpiece passes the member 21, then the next adjacent workpiece, in its entirety, will drop into the channel, preparatory for delivery into one of the grooves of the drum 34. From this standpoint, it will be understood that two or more of the elements 17 can be employed on the chain 30, depending entirely upon the timing required for delivery of the workpieces to the receiving station defined in the present structure by the drum 34.

Having fully described my invention, what I claim as new and desire to secure by Letters Patent is:

1. In apparatus employing an endless drive chain for feed of workpieces through a predetermined path in the apparatus, a feed element of substantially I-beam cross-sectional form providing on the element a wide pusher part, a wide mounting part spaced with respect to the pusher part by a narrow web, one side of the mounting part including a recess, the mounting part having an aperture extending longitudinally therethrough and opening into said recess, a link fitting snugly in said recess and having an aperture registering with the aperture of the mounting part, a coupling pin securing said link in the mounting part, and said link constituting a portion of one of the links of the drive chain.

2. An apparatus as defined in claim 1, wherein the contour of the recess and the portion of the link arranged in the recess is such as to key the parts against relative movement one with respect to the other.

References Cited in the file of this patent

UNITED STATES PATENTS

| | | |
|---|---|---|
| 561,361 | Trendel | June 2, 1896 |
| 821,761 | Stanley | May 29, 1906 |
| 1,280,669 | Copeland | Oct. 8, 1918 |
| 1,281,912 | Cohn | Oct. 15, 1918 |
| 1,490,594 | De Lateur | Apr. 15, 1924 |
| 1,710,389 | Toppin et al. | Apr. 23, 1929 |
| 2,058,727 | Schreiber | Oct. 27, 1936 |
| 2,264,468 | Alexander et al. | Dec. 2, 1941 |
| 2,358,563 | Donaldson | Sept. 19, 1944 |
| 2,510,658 | Rassmann | June 6, 1950 |
| 2,542,330 | Henderson et al. | Feb. 20, 1951 |
| 2,643,404 | Fray | June 30, 1953 |
| 2,880,852 | Bergmann | Apr. 7, 1959 |
| 2,908,420 | Hoffmann et al. | Oct. 13, 1959 |